Dec. 14, 1965 J. HUNTER 3,223,303

TAPE GUIDE FOR MAGNETIC RECORDERS

Filed May 21, 1962 2 Sheets-Sheet 1

INVENTOR
Jonathan Hunter
By Richard Zentner
Agent

Dec. 14, 1965 J. HUNTER 3,223,303

TAPE GUIDE FOR MAGNETIC RECORDERS

Filed May 21, 1962 2 Sheets-Sheet 2

INVENTOR:
Jonathan Hunter
By Richard Zentner
Agent

United States Patent Office 3,223,303
Patented Dec. 14, 1965

3,223,303
TAPE GUIDE FOR MAGNETIC RECORDERS
Jonathan Hunter, Los Angeles, Calif., assignor to Litton Systems, Inc., Beverly Hills, Calif.
Filed May 21, 1962, Ser. No. 196,326
8 Claims. (Cl. 226—197)

This invention relates to tape guides for magnetic recorders and more particularly to tape guides for changing the direction of tape motion.

In conventional tape recorders using two reels lying in the same plane and having their axes parallel, simple cylindrical rollers provide adequate guiding when it is necessary to change the direction of tape motion. Such changes in direction are normally restricted to those in which the tape, or its centerline representing its direction of motion, remains within one plane which is perpendicular with respect to the plane of the tape. Tape guides for achieving this type of directional change generally involve cylindrical idle rollers or stationary cylindrical surfaces along which the tape passes in sliding relationship. In view of the fact that no stretching force is exerted on the tape, and no other disturbing phenomena occur with tape guides for changing direction of motion within a plane, as defined above, little difficulty is encountered with this type of tape guide under normal operating conditions.

However, many modern forms of tape machines do not have simple tape paths. In the case of the new cartridges employing endless or closed loops of tape, for example, complex tape paths are required. Thus, the center line of the tape does not remain in a single plane, and the tape does not stay perpendicular to a single plane. Numerous designs of recording devices, and especially those of the compact type where a minimum space requirement is of significant importance, call for tape guides shifting the plane in which the tape moves. Such shift includes a change in direction of motion, as represented by the correlated change in position of the centerline of the tape. When it is necessary to shift or displace the tape path from one plane to another, and simultaneously rotate the tape about its centerline to change the angle formed with respect to any reference plane, conical rollers or stationary conical guide surfaces are frequently used to provide the necessary displacement and twisting of the tape.

When a tape is guided around conical surfaces of rotatably mounted idler rollers, speed differences along the opposite tape edges occur which lead to uneven distribution of stretching forces acting on the tape, accompanied by a combination of sliding in the region of one tape edge with a genuine frictional engagement of the other tape edge with the conical roller. In all cases, the tape has a tendency to shift its position with respect to a conical guide surface by displacement generally in the direction toward the apex of the conical surface. This displacement of the region of contact between the tape and the conical guide is well known in the art, and frequently referred to as "creeping." It introduces further uncontrollable distortion such as stretching or other deformation into the configuration of the moving tape, resulting in premature wearout, fluctuations in tape speed and destruction of the tape.

Up to the present time, the limitations and disadvantages of conventional direction-changing tape guides discussed in the preceding paragraphs have not been overcome. In most instances, the tape path is merely designed to minimize the adverse effects. This is achieved, for example, by designing tape recorders so that a change in direction of motion, when accompanied by shifting the angle of the orthogonal plane through the tape centerline, herein referred to as twisting, occurs along a considerable length of tape path. Comparatively bulky arrangements are the result of this attempt to reduce the consequences of inadequate tape guides. However, even then, fluctuations in tape speed and comparatively rapid wear on the tape cannot be avoided.

Accordingly, it is one of the main objects of the present invention to improve tape guides for tape recorders.

It is another object of this invention to extend the lifetime of magnetic tapes by reducing the mechanical stress exerted on the tape by direction-changing guides.

A further object of the invention is to maintain constant speed when tapes are subject to changes in direction of motion and twisting.

Another object of the present invention is the reduction of the size of tape recorders in which tape path includes locations at which the tape undergoes a change in direction, accompanied by a twisting action exerted on the tape.

One of the primary novel aspects of the invention involves an empirical method which provides a successful solution to the complex tape guide problem outlined above. In accordance with one of the broader aspects of the present invention, a method for determining the optimum configuration of a direction-changing tape guide includes firmly gripping both ends of a length of strip material, such as a bendable strip of metal, and displacing the strip ends, one with respect to the other, until each of the ends assumes a position with respect to the other corresponding to the desired relative position of the plane and the direction of motion of the incoming tape portion with respect to the outgoing tape portion. The resulting surface of the length of strip material may then be defined as the naturally assumed configuration of a length of strip material resulting from both bending and twisting forces applied to the ends of the strip material.

Tests have been made with tape guides obtained by using a strip of sheet metal stock, and using a pair of pliers to bend and twist it until the desired shape was obtained. The strip material then has its two end portions on either side of the bend defining the desired position of the tape, both as to the direction of movement and angle of orientation of the plane of the tape. It was found that considerable improvement in performance of tape recorders is achieved when using the bent and twisted strip itself as a guide for the tape. Alternatively, tape guide bodies having an identical surface may be produced by any known reproduction method, such as casting from a mold formed after the initially determined strip material, as described in more detail below. Furthermore, a mandrel or forming member of appropriate shape may be used for reproducing the configuration of the tape guiding surface by suitably bending and twisting strip material about the mandrel.

Further investigation of the apparently complex nature of the guide surface, as empirically determined, was made by mathematical analysis. While it may be assumed that the surface is described as an infinite number of two families of cones with gradually changing opening angles, it was found that, to a very close approximation sufficient for practical purposes, a pair of substantially conical surfaces pointing in substantially opposite directions is involved. The conical surfaces are positioned one with respect to the other so that they run smoothly one into the other. In terms of geometry, and in accordance with one feature of the invention, the surfaces meet along a common generatrix defining the line of contact of each of said conical surfaces with a common tangential plane.

In accordance with another feature of the invention, and in a somewhat different formulation, the path for the tape includes a sequence of surface elements of which the plane forms three angles with every set of three mutually orthogonal reference planes, and these angles continuously and smoothly change from one surface element to the adjacent surface element.

In a specific embodiment of the invention, the guide surface for the tape is defined as the surface of a body composed of a pair of half-cones having a conical surface which can be developed into a sector of a circle and a plane triangular cutting surface through the centerline, the half-cones being joined with said plane surfaces facing, preferably in contact with each other, the cone axes forming an angle greater than 90 degrees and pointing in opposite directions, both half-cones having a common generatrix lying in both plane surfaces, and a tangential plane through said generatrix being also common to both half-cones.

It will be apparent that the requirement for a common generatrix through which only one common tangential plane exists is the geometrically formulated expression for the condition that both conical surfaces run smoothly one into the other, without forming an edge nor a hollow corner.

At this point it should be noted that the postluation that the cone axes point in opposite directions is intended to cover any angle greater than 90 degrees when measured between the axes, and both taken in the same direction with respect to the cone shape, i.e., either toward the apexes or in the opposite direction.

While it is true that the preceding statement is made under the assumption that the cone axes lie in the same plane and intersect, this is not a necessary requirement for operability. However, the condition of oppositely pointing axes toward the apexes may be defined by the statement that the axes point away from a symmetry plane imagined, for example, half-way between the apexes and intersecting the connecting line between the apexes; it will be clear that this definition is also applicable to cases where the cone axes do not intersect.

The actual size and proportions, such as the cone angles, the angle formed between the cone axes and so forth, are determined from case to case in accordance with the specific requirements determined by the design and layout of a recording machine and the configuration of the path for the tape in the machine. It is to be understood that the terms "conical surface" and "cone" as used herein refer to surfaces and the enclosed bodies, respectively, defined by the motion of a straight line of which one point remains fixed and another point follows a closed path which may be a circle, an ellipse or another path returning to its origin.

From a physical standpoint, the excellent properties of the tape guide are believed to result from two principal factors. First, with a guide surface corresponding to a bent strip of metal, the length of contact of the moving tape and its guide is the same for both edges and across the entire width of the tape. This prevents the occurrence of differential frictional forces which cause creeping, stresses within the tape, and the resulting malfunctions in conventional guides. The second factor involves the balanced "bi-conical" configuration. Thus, as noted above, the guiding surface turns out to have the form of two oppositely pointed cones which are joined so that their surfaces are smoothly continuous. The increasing size of one cone tends to produce lateral forces in one direction, but these are balanced by opposite forces from the other cone-like surface.

The novel features which are believed to be characteristic of the invention, both as to its organization and method of construction and operation, together with further objects and advantages thereof, will be better understood from the following description considered in connection with the accompanying drawing in which illustrative embodiments of the invention are disclosed, by way of example. It is to be expressly understood, however, that the drawing is for the purpose of illustration and description only and does not constitute a limitation of the invention.

In the drawing:

FIG. 1 schematically illustrates, in top view, the simplified layout of a closed-loop tape recorder in which a pair of tape guides in accordance with the invention is employed;

Identical or similar elements are designated by the same reference numerals and characters throughout the several views of the drawing.

Figures 1, 2:
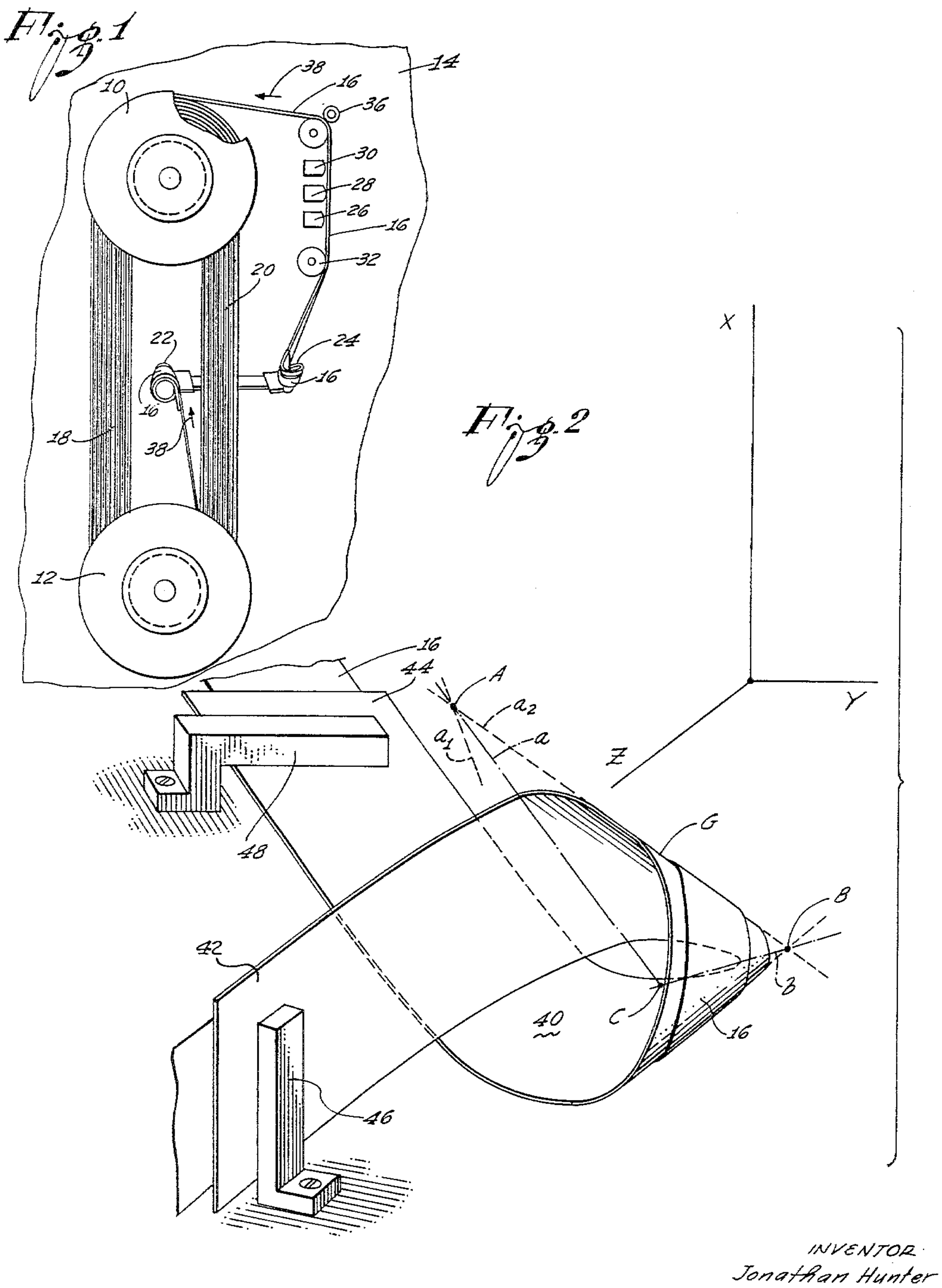
FIG. 2 is an isometric view of one embodiment of the invention, illustrating one of the tape guides of FIG. 1.

Referring now to the specific embodiment illustrated in the drawing, an endless or closed-loop tape recorder is schematically shown in a top view in FIG. 1. A pair of reels 10 and 12 is mounted on a panel 14, and a conventional magnetizable closed-loop tape, generally designated 16, is wound and guided as schematically shown. More specifically, the tape is wound in a number of layers around both reels 10 and 12 to form two multilayer bundles 18 and 20 of closely adjacent layers. Frequently, forty to fifty or more layers are used. The innermost layer is guided to separate from the bundle 20, over a tape guide 22 formed in accordance with the invention, below and across the tape layer bundle 20, to a second similar tape guide 24 and across three transducer heads 26, 28 and 30, arranged between idle rollers 32 and 34, and returned to reel 10 to form the outermost layer of firstly the bundle 18 and then of bundle 20. A driving capstan 36 for the tape frictionally cooperating with idle roller 34, and rotated by a conventional mechanism including a motor and gears hidden below the panel 14, may be used. Of the three transducer heads shown, 26 may represent an eraser head while 28 and 30 designate a recording head and a reproducing head, respectively.

At this point it should be noted that the assembly as described in the preceding paragraph is an illustrative example of a tape recorder assembly. All of the elements mentioned may be arranged in any other manner and a different number of heads, reels or other components may be used.

The present invention is particularly applicable to tape handling apparatus where it is desired to change both the direction of motion of the tape and the plane in which the tape moves. In the specific example shown in FIG. 1, and assuming that the tape is driven by capstan 36 to move in the direction of arrows 38, it can be seen that the tape, when approaching tape guide 22, moves in a plane perpendicular with respect to the paper, and in an upward direction, while the outgoing portion passing below tape bundle 20 lies in a plane parallel with the plane of the paper and moves horizontally across the figure. It will be understood that the tape guide 22 accomplishes both a change in direction and a change in plane, which combination involves what is termed herein a bending and twisting action exerted on the tape. In a similar manner, tape guide 24 acts to again change direction and plane of tape motion as can easily be seen from FIG. 1.

Referring now to FIG. 2, it has been stated above that the shape of a tape guide surface in accordance with the invention may be obtained empirically by bending and twisting a length of strip material, and FIG. 2 illustrates the shape of one of the tape guides 22, 24 of FIG. 1 formed in this manner. In order to more clearly illustrate the spatial relationship of the elements involved, FIG. 2 includes a conventional system of coordinate orthogonal axes $x$, $y$ and $z$.

It is now assumed that the specific design of a tape recorder such as that shown in FIG. 1 involves a path for the tape which includes an incoming path with the tape lying in the $x$, $z$-plane and moving in the direction of the $z$ axis, and an outgoing path in the $z$, $y$-plane with a direction of path forming an angle of about 45 degrees with the negative $y$ and $z$ axes. FIG. 2 illustrates a length of strip material, generally designated by reference numeral 40. Any suitable sheet metal may be used. The metal strip is flat in its original configuration. Then, an operator firmly holds each of the ends 42 and 44 of the strip, for example by means of a pair of pliers held in each hand, and applies a bending and twisting force to the strip until it assumes the shape shown in FIG. 2. In view of the fact that the intermediate portion between the ends 42 and 44, which is practically the entire length of the strip 40, is unsupported and in no way constrained during the step of bending and twisting, the surface obtained in this manner may be defined as the naturally assumed configuration of a length of strip material resulting from both bending and twisting forces applied to the ends of said length of strip material. The strip 40 exhibits a smoothly continuing curved surface, and may be used for guiding tape 16 as shown in FIG. 2. A pair of brackets 46 and 48 indicate one of the many alternative manners in which the resulting tape guide may be secured to panel 14 which, in FIG. 2, coincides with the $z$, $y$-plane. The end portions 42 and 44 suitably form flat incoming and outgoing portions, respectively, for the tape 16, as indicated by arrows 50 and 52; of course, the direction of motion may be reversed.

As stated above, it can be shown by mathematical analysis of the curved and twisted surface that the strip, or more exactly the surface of the strip used as the tape guide surface, approaches in very close approximation a set of two cones. The incoming and outgoing flat portions 42 and 44 lie in planes tangential to one and the other cone, respectively. Although this fact is important for flawless operation, it is not directly related to the following discussion of the curved surface itself.

Reference is again made to FIG. 2 in which the theoretically derived apexes of the two cones are designated A and B. The axes "$a$" and "$b$" of the cones intersect at a poiint C which generally falls within the space encompassed by the loop formed by strip 40. Axes "$a$" and "$b$" form an angle greater than 90 degrees, which fact may also be expressed by the statement that the axes, when taken in directions toward the respective apexes, point away from a symmetry plane imagined between apex A and B. As stated above, this also applies to embodiments in which the cone axes "$a$" and "$b$" do not intersect, and this case is discussed in more detail below and in connection with FIG. 6.

Reverting now to FIG. 2, it must be borne in mind that the figure is an isometric view, and apex A occupies a location toward the viewer and in front of the beginning of the curvature, when proceeding from the incoming tape guide portion 42. In other terms, the upper portion of the loop in FIG. 2 pertains to a cone having axis "$a$" and apex A.

The strip 40, or the guide surface formed by it, disregarding the thickness of the material, follows the cone defined by A, "$a$", and the opening angle of the cone is indicated by a pair of generatrices shown as additional dashed lines $a_1$, $a_2$ through apex A. The actual surface of a bent strip is, for practical purposes, identical or at least sufficiently closely identical with that of the theoretical conical surface described, and continues until it reaches one special generatrix indicated by G in FIG. 2. For purposes of easier illustration, the generatrix G is shown in FIG. 2 as that which forms the contour of the strip 40. Continuing from the generatrix G in the direction of tape motion indicated by arrows 50 and 52, the curved guide surface becomes a second substantially conical surface having its apex at B, the axis "$b$" of the second cone intersecting axis "$a$" of the first cone at point C.

Figure 3:
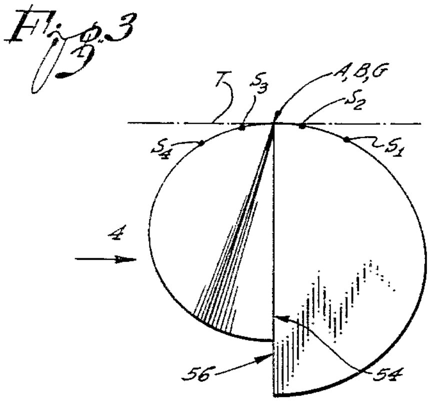
FIGS. 3, 4 and 5 are a front view, a side view and an isometric view of a tape guide body including a surface formed by two half-cones to illustrate the geometrical interrelationship of surface elements involved in another embodiment of the invention.
Figure 5:
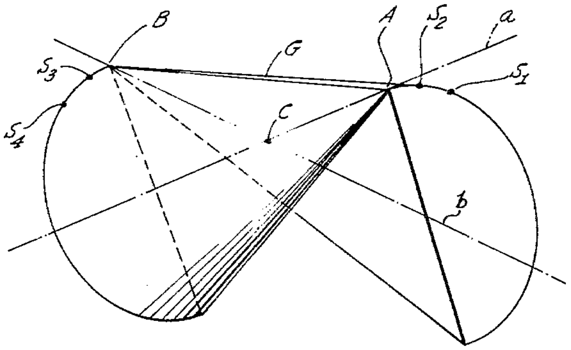
Figure 4:
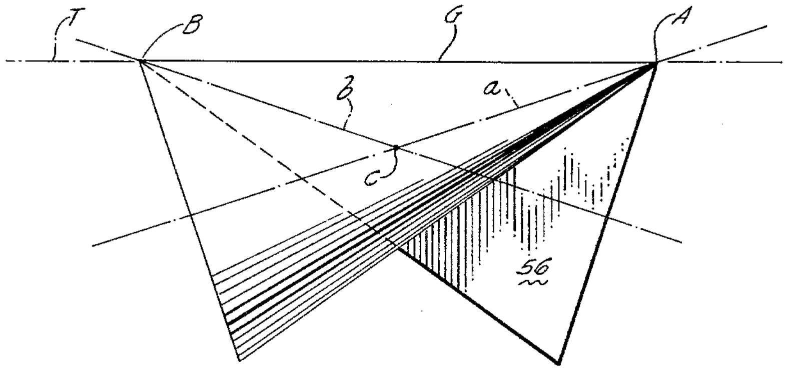

The actual relationship of the two cones is illustrated in FIGS. 3, 4 and 5 in which the tape, any other element of a tape recorder and brackets or other supporting structures are omitted for the sake of clarity. However, it is expressly understood that the body shown, a composed of two half-cones illustrates a surface configuration of two combined conical surfaces and may be modified in any desired manner, as long as it includes the tape guiding portion of the surfaces, in accordance with the invention. In view of the fact that the guide surface may form part of any desired supporting structure, and that those skilled in the art may easily incorporate the disclosed features in a tape guide suitable for a selected design, the omitted elements are not material for the understanding of the invention.

It will be understood from the foregoing discussion in connection with FIG. 2 that the two analytically determined cones, in terms of geometry, penetrate one another. For practical purposes, simplified illustration and physical realization, two portions, preferably half-cones, may be combined to form a tape guide. Referring now specifically to FIGS. 3 through 5, there is shown a body useful as a tape guide, and composed of two half-cones joined to each other along the triangular flat surfaces 54 and 56 formed by cutting through the originally complete cones. In all three figures, the apexes are designated A and B, the axes being "$a$" and "$b$", and the critical, common generatrix is designated G.

FIG. 3 is a front view of the body and the two apexes A and B therefore appear at the same point. Additionally, this point also represents the generatrix G, as can easily be seen from FIG. 4 which is a side view of FIG. 3 taken in the direction of arrow 4. Since the axes lie in the triangular intersecting planes 54 and 56 of their respective cones, and the cones are joined one to another as shown so that intersecting planes 54 and 56 lies in the same plane, axes "$a$" and "$b$" intersect at C (FIGS. 4 and 5), forming an angle greater than 90 degrees. It should be noted that each cone is illustrated as having a circular base and an apex, for the sake of clarity of description. However, in practice, the more essential portions are the conical surfaces. Industrial embodiments of the invention may dispense with portions of the biconical body which do not contribute to the actual tape guiding surface, in order to simplify the structure, or adapt it for use in a recorder.

The more important geometrical relationships which result from the fact that both cones have a common generatrix G will now be considered. With reference to any sequence of an infinite number of surface elements which includes the region of generatrix G, it will be seen that the conical surfaces run smoothly into one another. To support this statement, attention is directed to a generatrix on the cone with apex B, which might be the straight line or segment connecting a point $S_1$ and apex B in FIGS. 3 and 5. By moving the point from $S_1$ along the circumference of the base of the cone and toward A, it passes through point $S_2$ until it reaches A; then, the segment coincides with the common generatrix AB, or G. During this progression of a generatrix, it is undestood that the other end point of the segment remains stationary at location B, which is the apex of the cone.

When the moving generatrix passes through AB, point A remains stationary and the point which moves is shifted to the base of the other cone, to pass through locations $S_3$ and $S_4$, as motion of the generatrix continues.

It can be seen that, although a smooth continuous motion is involved, the direction of the generatrix changes as it passes through AB. More particularly, the generating line points upward with respect to FIG. 3 as it passes through positions $S_1B$ and $S_2B$. At the location AB, the generatrix is common to both cones and forms a right angle with the plane of FIG. 3. In position $AS_3$ and $AS_4$, the generatrix points downward. It may also be noted that for regions on one side of line AB the generating line or generatrix pivots about point A while on the other side of the line AB, it pivots about point B.

An infinitely small surface element of a tape moving along the guide surface occupies a plane which is tangential to the guide surface. In order to apply this fact to the presently discussed composite surface of two smoothly combined half-cones, the tangential planes through the sequence of positions of the generatrix of the preceding paragraphs will now be discussed.

When visualizing the body shown in FIG. 3–5, and referring to three arbitrarily selected orthogonal reference planes which may be (1) the plane of the triangular surfaces 54, 56 which is common to both half-cones and positioned parallel with the plane of FIG. 4, (2) the plane of the paper of FIG. 3, and (3) a third plane orthogonal to both of them, it will be apparent that a tangential plane including a generatrix passing from one cone through the position AB to the other cone smoothly and continuously changes the angles formed with all three reference planes (1), (2) and (3). This can be demonstrated by considering the lines of intersection of the tangential plane with two of the reference planes.

When the tangential plane includes the generatrix $S_1B$, the line of intersection of the tangential plane with the plane of FIG. 3 extends from the left upper portion to the right lower portion of the plane of FIG. 3. With the point $S_1$ moving through $S_2$ and into the apex A, the line of intersection rotates counterclockwise and coincides with the line T of FIG. 3. As the tangential plane continues its motion through generatrices $AS_3$ and $AS_4$, the intersection with the plane of paper of FIG. 3 continues its counterclockwise rotation.

Considering now the intersection of the tangential plane with the plane defined by the common surface 54, 56, it can be seen that, with the same shifting of the tangential plane, this line of intersection in the beginning points downwardly toward apex B, forming an acute angle with the plane of the paper of FIG. 3. When the tangential plane moves through the common generatrix G, the line of intersection becomes coincident with G forming a right angle with the plane of FIG. 3 because then the tangential plane forms a right angle with both reference planes (1) and (2). These planes of reference are parallel with the planes of the paper of FIG. 3 and FIG. 4, respectively. Upon continuation of motion of the tangential plane, its intersection now passes through, and points downwardly toward, apex A.

The motion of the tangential plane, as described by the rotation of its line of intersection with the plane of the paper of FIG. 3 as a reference plane, combined with the change of angle formed by the line of intersection of the tangential plane with the reference plane 54, 56, is accompanied by a similar shift with respect to the third reference plane. More generally, all three angles formed by the tangential plane with the three reference planes noted above, gradually change. It may readily be determined by a simple extension that the motion of the tangential plane involves a change of all three angles formed with every set of three mutually orthogonal reference planes. It should be noted that the foregoing sentence expresses the same geometrical relationship in two different manners inasmuch as the same condition is stated with respect to different reference systems.

Whatever has been stated with respect to the tangential plane must necessarily be true for an infinitely small surface element of the tape guide surface under consideration. Accordingly, in the region of the combined conical surface which includes the common generatrix G, a sequence of surface elements exists, of which the plane forms three angles with every arbitrarily selected three mutually orthogonal reference planes, and all these angles continuously and smoothly change from one surface element to the adjacent surface element.

As a further requirement for the tape guide surface of the invention, it will be appreciated that useful results can be obtained only when the surface is a developable surface. As used in this specification, the term "developable surface" refers to a surface which can be unfolded into, or obtained from shaping, a flat figure.

Figure 6:
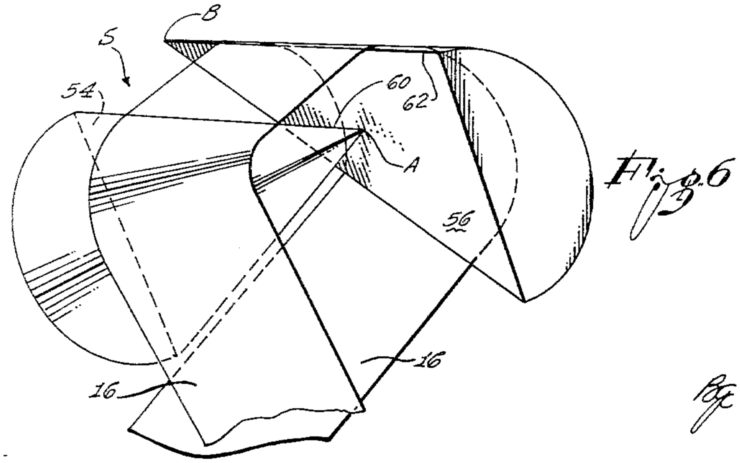
FIG. 6 is an exploded view of the guide body of FIGS. 3–5, schematically illustrating its use as a tape guide.

In the preceding passage, the specific tape guide surface is discussed from a purely geometrical point of view, and, as stated above, the tape is omitted in FIG. 3–5 for the sake of clarity. FIG. 6 is an exploded view of FIG. 5, showing the cones separated by space S. With the triangular cutting surfaces 54 and 56 in a parallel relationship, all of the statements and definitions given above are also true and applicable. The upper edges 60 and 62 of the cones define the common tangential plane represented by the length of tape 16 between them. It may be considered that in this arrangement the common generatrix G of FIGS. 3–5 is split into two parallel lines 60, 62, separated from one another by the space S. For practical purposes, the space S may be filled out, so that the actual body forming the tape guide surface includes two half-cones, as shown, with a bridging portion (not shown) within the space S and connecting the cones. The bridging portion would supply a flat surface supporting the portion of tape running from one cone to the other. Here again, such bridging element, since it may easily be visualized, has been omitted for the sake of clarity.

It has been stated that a tape guide, according to the invention, for magnetic recording machines includes the developable smooth surface described in the preceding paragraphs. In practice, a tape guide structure for tape recorders incorporates a body of any suitable shape, with the inclusion of members or parts for securing it in the desired position on, for example, a panel of a recording machine, as schematically indicated in FIGS. 1 and 2.

It is to be understood that the above-described arrangements are illustrative of the application of the principles of the invention. Numerous other arrangements may be devised by those skilled in the art without departing from the spirit and scope of the invention. Thus, by way of example and not of limitation, the tape guide structure may be formed by bending and twisting a length of strip material. Alternatively, a tape guide body including the guide surface of the invention may be produced by casting or milling, using the bent and twisted strip as a master or model. By way of example, the aperture in the loop formed by strip 40 in FIG. 2 may be filled out so that a solid, more rigid tape guide is obtained. The resultant structure could be used in this form, or employed as a model for additional cast or molded guides. The tape guide may, of course, also be formed as shown in FIGS. 3 through 5, by bonding together two true solid cones which have been cut in half. As mentioned above, the apexes and bases of the cones are generally adapted to permit assembly, at the appropriate location, with the recorder or other apparatus. This may include internal screw threads or brackets of the type shown in FIG. 2; any other suitable arrangement may also be adopted. The type, shape and position of the selected securing means merely depends on the specific design of the tape recorder, and it is within the skill of the one versed in the art to select appropriate attaching means for assembling with the machine a body having the tape guide surface of the invention. As stated above, the term "conical surface" as used herein includes the surface of a cone having, for example, an elliptical base. Accordingly, a tape guide in accordance with the invention may include a pair of smoothly combined noncircular cones, or it may be a combination of an elliptical cone with a cone having a circular base, provided a common generatrix exists and the tangential plane through the common generatrix is also common to both cones. In accordance with an approximation which is probably even closer to the shape of a length of strip material bent and twisted as described hereinabove, the conical surfaces may be of increasing diameter, and such surface is generally considered to be generated by a straight line of which one point remains fixed in space whereas another point follows a spiral.

Accordingly, from the foregoing remarks, it is to be understood that the present invention is to be limited only by the spirit and scope of the appended claims.

What is claimed is:

1. A tape-handling apparatus comprising:
a substantially biconical tape guide;
means for directing a tape toward said guide along a first line in a predetermined direction; and
means for pulling the tape from the guide along a second line in a different direction;
said biconical tape guide having at least some portions of its surface rotated from perpendicularity with respect to the plane which both passes through the second line and is parallel to the first line;
said tape guide further constituting a continuous, developable surface, composed of the surfaces of two cones merging into one another in engagement with the tape, which is smoothly curved and has the same length of contact with the tape in the direction of tape movement at both edges of the tape and across the entire area of engagement of the tape and tape guide.

2. In combination:
a tape guide supporting structure, and
a body having a developable surface for longitudinally moving a tape along a path lying in said surface,
the developable surface including at least one region of two adjacent, substantially conical surface elements of which the tangential plane through generatrices of said conical surfaces forms three angles with any arbitrarily selected set of three mutually orthogonal reference planes,
with all of said three angles continuously and smoothly changing as the tangential plane moves through generatrices of adjacent ones of said two conical surface elements.

3. A direction-changing tape guide having a curved surface defined as a continuous, developable surface, formed by two merging conical surfaces tapering in substantially opposite directions, of which the tangential plane through a given point moving along the surface in the direction of tape motion smoothly changes its angle formed with any arbitrarily selected set of three mutually orthogonal reference planes.

4. In combination, a tape guide structure and a body having a continuous, developable surface, formed by two merging conical surfaces tapering in substantially opposite directions, defining a path for a longitudinally moving tape, the path including a sequence of surface elements of which the plane forms three angles with any arbitrarily selected set of three mutually orthogonal reference planes, said angles continuously and smoothly changing from one surface element to the adjacent surface element.

5. In combination, a tape guide supporting structure and a body having a continuous developable surface, formed by two merging conical surfaces tapering in substantially opposite directions, for longitudinally moving a tape along a path lying in said surface, the path including at least one region of adjacent surface elements for which the successive corresponding tangential planes form continuously and smoothly changing angles with any arbitrarily selected set of three mutually orthogonal reference planes.

6. A tape guide comprising a single body having a continuous developable guide surface for a tape, said guide surface including two conical surfaces arranged so that their cone axes form an angle and point in substantially opposite directions, the surfaces merging along a common generatrix which defines the line of contact of each of said conical surfaces with a common tangential plane.

7. A direction-changing tape guide for magnetic recorders, comprising a continuous developable guide surface for a tape, said continuous guide surface including at least two substantially conical surfaces running smoothly one into the other along a generatrix which is common to both cones, each conical surface of an adjacent pair of surfaces pertaining to a cone having its centerline pointing in a direction substantially opposite that of the cone of an adjacent surface.

8. A tape guide for magnetic recorders in which a guide surface for the tape is defined as
the surface of a body composed of a pair of half-cones having both a conical surface and a plane surface through the centerline,
the half-cones being joined with said plane surfaces facing each other,
the cone axes forming an angle greater than 90 degrees and pointing in opposite directions,
both half-cones having a common generatrix lying in both plane surfaces, and
a tangential plane through said generatrix being also common to both half cones.

References Cited by the Examiner

UNITED STATES PATENTS

| | | | |
|---|---|---|---|
| 302,311 | 7/1884 | Anthony | 226—197 X |
| 1,114,478 | 10/1914 | Ibarra | 226—184 |
| 2,141,719 | 12/1938 | Lyon | 29—549 |
| 2,321,426 | 6/1943 | Rouan et al. | 226—197 X |
| 2,760,773 | 8/1956 | Brodie | 226—197 |
| 3,042,331 | 7/1962 | Bierman | 226—197 X |
| 3,055,103 | 9/1962 | Fernberg | 29—549 |
| 3,081,015 | 3/1963 | Stickel | 226—197 X |

M. HENSON WOOD, Jr., *Primary Examiner.*

JOSEPH P. STRIZAK, RAPHAEL M. LUPO, WILLIAM B. LABORDE, ROBERT B. REEVES, *Examiners.*